(12) United States Patent
Hong et al.

(10) Patent No.: US 10,310,141 B2
(45) Date of Patent: Jun. 4, 2019

(54) METAMATERIAL STRUCTURE AND METHOD OF FABRICATING THE SAME

(71) Applicants: ELECTRONICS AND TELECOMMUNICATIONS RESEARCH INSTITUTE, Daejeon (KR); KOREA UNIVERSITY RESEARCH AND BUSINESS FOUNDATION, Seoul (KR)

(72) Inventors: Sunghoon Hong, Daejeon (KR); Heon Lee, Seoul (KR); Yong Suk Yang, Daejeon (KR); In-Kyu You, Gongju-si (KR); Soo-Jung Kim, Incheon (KR); Hak-Jong Choi, Seoul (KR)

(73) Assignees: ELECTRONICS AND TELECOMMUNICATIONS RESEARCH INSTITUTE, Daejeon (KR); KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 0 days.

(21) Appl. No.: 15/671,922

(22) Filed: Aug. 8, 2017

(65) Prior Publication Data
US 2018/0045856 A1 Feb. 15, 2018

(30) Foreign Application Priority Data
Aug. 9, 2016 (KR) .................. 10-2016-0101507

(51) Int. Cl.
*B32B 3/02* (2006.01)
*G02B 1/00* (2006.01)

(52) U.S. Cl.
CPC .................. *G02B 1/007* (2013.01)

(58) Field of Classification Search
CPC .................................... G02B 1/007
See application file for complete search history.

(56) References Cited

U.S. PATENT DOCUMENTS

| | | | |
|---|---|---|---|
| 6,805,904 B2 * | 10/2004 | Anders | B82Y 30/00 427/203 |
| 8,437,075 B2 | 5/2013 | Baik et al. | |
| 2010/0044209 A1 | 2/2010 | Banin et al. | |
| 2010/0259345 A1 | 10/2010 | Kim et al. | |
| 2011/0199273 A1 | 8/2011 | Kim et al. | |
| 2011/0274913 A1 | 11/2011 | Lin et al. | |
| 2012/0295081 A1 * | 11/2012 | Henze | C03C 1/008 428/201 |
| 2014/0113828 A1 * | 4/2014 | Gilbert | H01L 39/126 505/100 |

FOREIGN PATENT DOCUMENTS

KR 10-2009-0122453 A 11/2009
KR 10-2012-0031735 A 4/2012

* cited by examiner

*Primary Examiner* — Elizabeth E Mulvaney
(74) *Attorney, Agent, or Firm* — Rabin & Berdo, P.C.

(57) ABSTRACT

A metamaterial structure may include a first nanoparticle and a second nanoparticle containing a different material from the first nanoparticle. The first and second nanoparticles may be provided to be adjacent to each other and to be in an electrically-coupled state.

19 Claims, 11 Drawing Sheets

METAMATERIAL STRUCTURE AND METHOD OF FABRICATING THE SAME

CROSS-REFERENCE TO RELATED APPLICATIONS

This U.S. non-provisional patent application claims priority under 35 U.S.C. § 119 to Korean Patent Application No. 10-2016-0101507, filed on Aug. 9, 2016, in the Korean Intellectual Property Office, the entire contents of which are hereby incorporated by reference.

BACKGROUND OF THE INVENTION

The present disclosure relates to a metamaterial structure and a method of fabricating the same, and in particular, to a metamaterial structure having an improved optical property and a method of fabricating the same.

A metamaterial structure has a new property that is not seen in nature. For example, the metamaterial structure has a negative refractive index. The metamaterial structure may be used to realize an invisible cloak, a high-performance lens, a highly-efficient small antenna, a highly-sensitive sensor, or the like. The metamaterial structure may be used in medicine, biophysics, spectroscopy, imaging and security applications.

SUMMARY

Some embodiments of the inventive concept provide a metamaterial structure with adjustable permittivity.

Some embodiments of the inventive concept provide a metamaterial structure with adjustable refractive index.

Some embodiments of the inventive concept provide a metamaterial structure with improved optical characteristics.

According to some embodiments of the inventive concept, a metamaterial structure may include a first nanoparticle and a second nanoparticle containing a different material from the first nanoparticle. The first and second nanoparticles may be provided to be adjacent to each other and to be in an electrically-coupled state.

In some embodiments, the metamaterial structure may further include a conductive ligand coupled to a surface of each of the first and second nanoparticles.

In some embodiments, a space between the first and second nanoparticles may be less than 10 nm.

In some embodiments, the first and second nanoparticles may include metal particles that are respectively different from each other.

In some embodiments, each of the first and second nanoparticles may include silver (Ag), gold (Au), copper (Cu), aluminum (Al), nickel (Ni), chromium (Cr), or lead (Pb).

In some embodiments, the first nanoparticle may include a metal particle and the second nanoparticle may include a semiconductor particle.

In some embodiments, the second nanoparticle may include an elementary semiconductor particle or a compound semiconductor particle.

In some embodiments, the second nanoparticle may include CdSe, PbSe, PbS, or PbTe.

In some embodiments, the first and second nanoparticles may be in direct contact with each other.

In some embodiments, the metamaterial structure may further include a third nanoparticle containing a material different from the first and second nanoparticles. The first to third nanoparticles may be provided to be adjacent to each other and to be in an electrically-coupled state.

In some embodiments, the third nanoparticle may include a metal particle or a semiconductor particle.

In some embodiments, the metamaterial structure may have a negative refractive index.

According to some embodiments of the inventive concept, a metamaterial structure may include a substrate, and patterns provided on the substrate. The patterns may be arranged in a direction parallel to a top surface of the substrate, and each of the patterns may include a first nanoparticle and a second nanoparticle containing a different material from the first nanoparticle. The first and second nanoparticles may be provided to be adjacent to each other and to be in an electrically-coupled state.

In some embodiments, each of the patterns may have a circular pillar shape.

In some embodiments, a height and a diameter of each of the patterns may range from several nanometers to several hundred micrometers, and a distance between directly adjacent ones of the patterns may range from several nanometers to several hundred micrometers.

According to some embodiments of the inventive concept, a method of fabricating a metamaterial structure may include providing a substrate, providing a nanoparticle solution on the substrate, the nanoparticle solution containing a first nanoparticle and a second nanoparticle containing a different material from the first nanoparticle, exerting pressure on the nanoparticle solution using a stamp, and curing the nanoparticle solution to form patterns including the first and second nanoparticles. The first and second nanoparticles may be provided to be adjacent to each other and to be in an electrically-coupled state, the stamp may have an uneven surface, and shapes of the patterns may be defined by the uneven surface of the stamp.

In some embodiments, the method may further include sintering the patterns to bring the first and second nanoparticles in contact with each other.

In some embodiments, each of the first and second nanoparticles may include a first ligand coupled to a surface thereof. The method may further include performing a ligand exchange process on the patterns, and here, the ligand exchange process may be performed to convert the first ligand, which is coupled to each of the first and second nanoparticles, into a second ligand. A length of the second ligand may be shorter than that of the first ligand.

In some embodiments, the ligand exchange process may include preparing a substitutional solution, in which the second ligand is contained, and then, dipping the patterns into the substitutional solution.

In some embodiments, the second ligand may include $SCN^-$, $I^-$, $Br^-$, $Cl^-$, or $OH^-$.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

Figure 1:
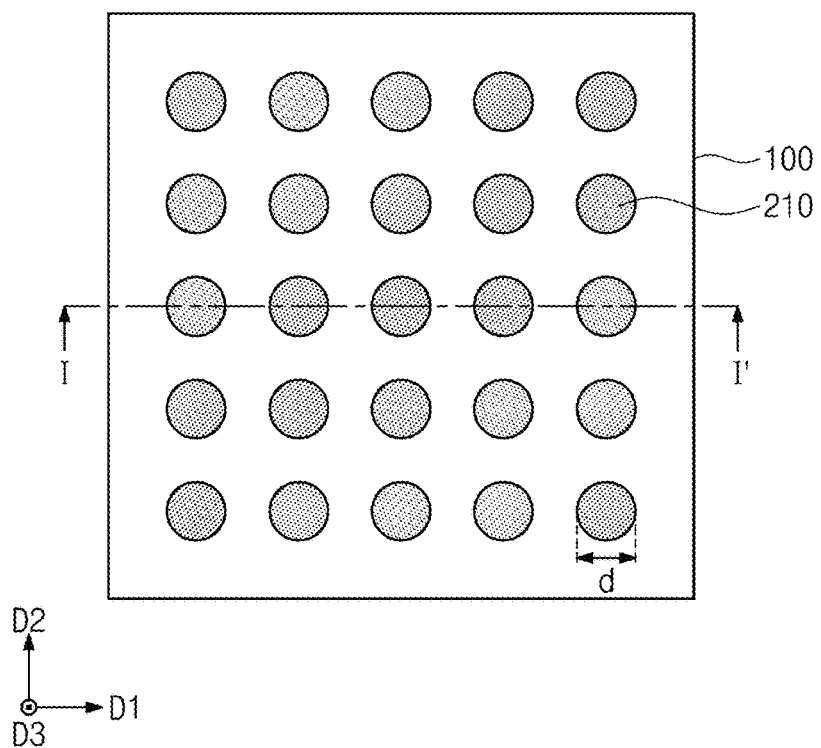
FIG. 1 is a plan view of a metamaterial structure according to some embodiments of the inventive concept.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Example embodiments of the inventive concepts will now be described more fully with reference to the accompanying drawings, in which example embodiments are shown. Example embodiments of the inventive concepts may, however, be embodied in many different forms and should not be construed as being limited to the embodiments set forth herein; rather, these embodiments are provided so that this disclosure will be thorough and complete, and will fully convey the concept of example embodiments to those of ordinary skill in the art. In the drawings, the thicknesses of layers and regions are exaggerated for clarity. Like reference numerals in the drawings denote like elements, and thus their description will be omitted.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Example embodiments of the inventive concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 2:
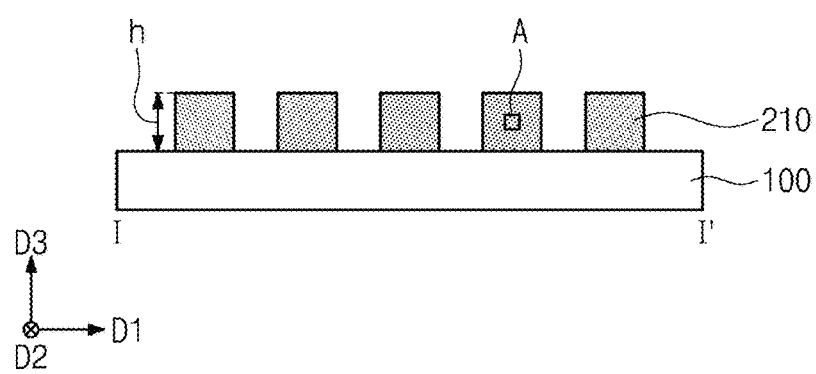
FIG. 2 is a sectional view taken along line I-I' of FIG. 1.
Figure 3:
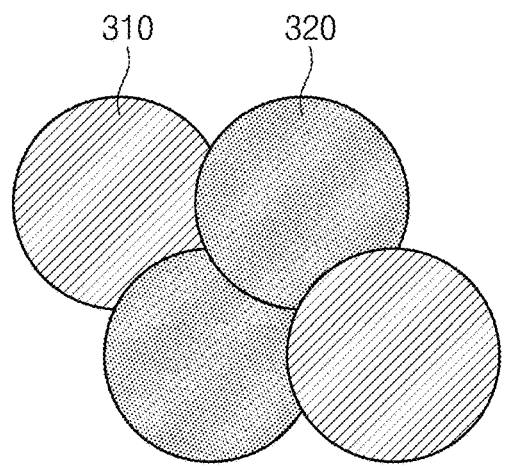
FIG. 3 is an enlarged view of a portion 'A' of FIG. 2.

FIG. 1 is a plan view of a metamaterial structure according to some embodiments of the inventive concept. FIG. 2 is a sectional view taken along line I-I' of FIG. 1. FIG. 3 is an enlarged view of a portion 'A' of FIG. 2.

Referring to FIGS. 1 and 2, a substrate 100 may be provided. The substrate 100 may be formed of or include a transparent material. For example, the substrate 100 may be formed of or include silicon, glass, or transparent polymer. In some embodiments, the substrate 100 may be a flexible substrate.

A pattern 210 may be provided on the substrate 100. The pattern 210 may have a circular pillar shape. However, the shape of the pattern 210 is not limited thereto. The pattern 210 may have a diameter d, in a direction parallel to a top surface of the substrate 100. For example, the diameter d of the pattern 210 may range from several nanometers to several hundred micrometers in one of first and second directions D1 and D2, where the first and second directions D1 and D2 are not parallel to each other but are parallel to the top surface of the substrate 100. The pattern 210 may have a height h, in a third direction D3 normal to the top surface of the substrate 100. For example, the height h of the pattern 210 may range from several nanometers to several hundred micrometers.

A plurality of patterns 210 may be provided on the substrate 100. The plurality of patterns 210 may be two-dimensionally arranged in a plan view that is parallel to the first and second directions D1 and D2. For example, the plurality of patterns 210 may be spaced apart from each other by a distance, which ranges from several nanometers to several hundred micrometers, in the first and second directions D1 and D2. In some embodiments, the substrate 100 and plurality of patterns 210 may constitute a metamaterial structure. In the present specification, the metamaterial structure may have a negative refractive index, which is not seen in nature.

Referring to FIG. 3, the pattern 210 may include a first nanoparticle 310 and a second nanoparticle 320 that are different from each other. The nanoparticle may have a size ranging from several to several hundred nanometers. The first and second nanoparticles 310 and 320 may have substantially the same size. The first nanoparticle 310 may include a metallic material. For example, the first nanoparticle 310 may be formed of or include silver (Ag), gold (Au), copper (Cu), aluminum (Al), nickel (Ni), chromium (Cr), or lead (Pb). In some embodiments, the second nanoparticle 320 may be formed of or include a metallic material different from that of the first nanoparticle 310. For example, the second nanoparticle 320 may be formed of or include at least one of metallic materials that are selected from silver (Ag), gold (Au), copper (Cu), aluminum (Al), nickel (Ni), chromium (Cr), or lead (Pb) but are different from that of the first nanoparticle 310. In certain embodiments, the second nanoparticle 320 may be formed of or include a semiconductor material. For example, the second nanoparticle 320 may include an elementary semiconductor material (e.g., silicon (Si) or germanium (Ge)) or a compound semiconductor material (e.g., CdSe, PbSe, PbS, or PbTe).

Directly adjacent ones of the first and second nanoparticles 310 and 320 may be in direct contact with each other. The pattern 210 may include a plurality of first nanoparticles 310 and a plurality of second nanoparticles 320. Although, for concise description, two first nanoparticles 310 and two second nanoparticles 320 are only illustrated in FIG. 3, the numbers of the first nanoparticles 310 and the second nanoparticles 320 are not limited thereto. Directly adjacent ones of the first nanoparticles 310 may be in direct contact with each other. Directly adjacent ones of the second nanoparticles 320 may be in direct contact with each other.

The first and second nanoparticles 310 and 320 may be adjacent to each other, thereby being electrically coupled to each other. In the present specification, the expression "electrically coupled to each other" may be used to mean a state in which an electromagnetic field to be produced by a nanoparticle affects another nanoparticle. The electromagnetic field may be produced by oscillation of electrons of a nanoparticle which may occur when an electromagnetic wave is incident into the nanoparticle. The first and second nanoparticles 310 and 320, which are electrically coupled to each other, may have a plasmon resonance frequency that is different from those of the first and second nanoparticles 310 and 320. In the case where the metamaterial structure includes the first and second nanoparticles 310 and 320, the metamaterial structure may have permittivity different from that of each of the first and second nanoparticles 310 and 320. Here, the permittivity of the metamaterial structure may depend on the kind and the shape of each of the first and second nanoparticles 310 and 320 and/or on a distance between the first and second nanoparticles 310 and 320. In general, refractive index is determined by permittivity and permeability. According to some embodiments of the inventive concept, the permittivity and refractive index of the metamaterial structure may be controlled by selecting or changing the kind of each of the first and second nanoparticles 310 and 320.

Figure 4:
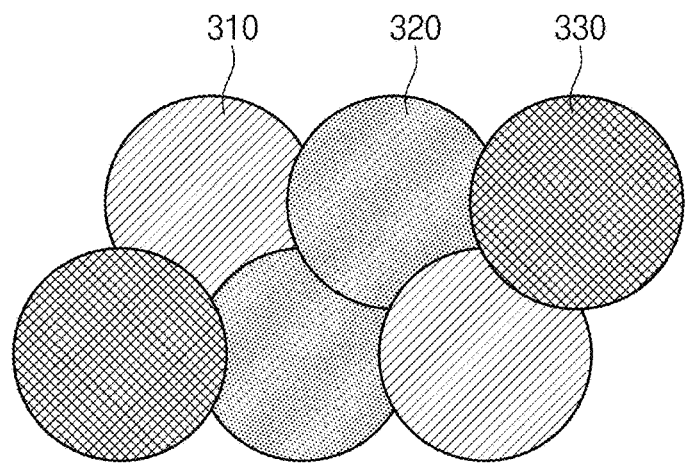
FIG. 4 is an enlarged view of a portion (e.g., corresponding to the portion 'A' of FIG. 2) of a metamaterial structure according to some embodiments of the inventive concept.

FIG. 4 is an enlarged view of a portion (e.g., corresponding to the portion 'A' of FIG. 2) of a metamaterial structure according to some embodiments of the inventive concept. For concise description, an element previously described with reference to FIGS. 1 to 3 may be identified by a similar or identical reference number without repeating an overlapping description thereof.

Referring to FIG. 4, a pattern 210 may include a first nanoparticle 310, a second nanoparticle 320, and a third nanoparticle 330 that are different from each other. The first and second nanoparticles 310 and 320 may be substantially the same as the first and second nanoparticles 310 and 320 described with reference to FIG. 3.

A size of the third nanoparticle 330 may be substantially the same as that of each of the first and second nanoparticles 310 and 320. The third nanoparticle 330 may be formed of or include a material different from that of the first and second nanoparticles 310 and 320. In some embodiments, the third nanoparticle 330 may be formed of or include a metallic material. For example, the third nanoparticle 330 may include a metallic material that is selected from silver (Ag), gold (Au), copper (Cu), aluminum (Al), nickel (Ni), chromium (Cr), or lead (Pb) but is different from those of the first and second nanoparticles 310 and 320. In certain embodiments, the third nanoparticle 330 may be formed of or include a semiconductor material. For example, the third nanoparticle 330 may be formed of or include an elementary semiconductor material (e.g., silicon (Si) or germanium (Ge)) or a compound semiconductor material (e.g., CdSe, PbSe, PbS, or PbTe).

The pattern 210 may include a plurality of first nanoparticles 310, a plurality of second nanoparticles 320, and a plurality of third nanoparticles 330. Although, for concise description, two first nanoparticles 310, two second nanoparticles 320, and two third nanoparticles 330 are only illustrated in FIG. 4, the numbers of the first, second, and third nanoparticles 310, 320, and 330 are not limited thereto. Directly adjacent ones of the first nanoparticles 310, directly adjacent ones of the second nanoparticles 320, and directly adjacent ones of the third nanoparticles 330 may be in direct contact with each other.

The first to third nanoparticles 310, 320, and 330 may be provided to be adjacent to each other and to be in an electrically-coupled state. In the case where the metamaterial structure includes the first to third nanoparticles 310, 320, and 330 electrically coupled to each other, the metamaterial structure may have permittivity different from that of each of the first to third nanoparticles 310, 320, and 330. According to some embodiments of the inventive concept, the permittivity and refractive index of the metamaterial structure may be controlled by changing the kind of each of the first to third nanoparticles 310, 320, and 330. Directly adjacent ones of the first to third nanoparticles 310, 320, and 330 may be in direct contact with each other.

As shown in FIGS. 3 and 4, the pattern 210 includes two or three different kinds of nanoparticles, but the inventive concept is not limited thereto. In other words, the pattern 210 may include three or more different kinds of nanoparticles.

Figure 5:
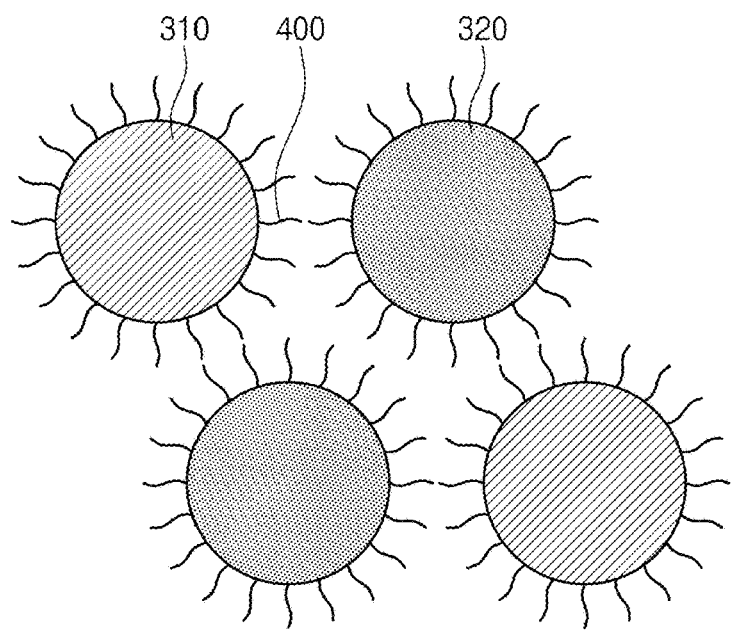
FIG. 5 is an enlarged view of a portion (e.g., corresponding to the portion 'A' of FIG. 2) of a metamaterial structure according to some embodiments of the inventive concept.

FIG. 5 is an enlarged view of a portion (e.g., corresponding to the portion 'A' of FIG. 2) of a metamaterial structure according to some embodiments of the inventive concept. For concise description, an element previously described with reference to FIGS. 1 to 3 may be identified by a similar or identical reference number without repeating an overlapping description thereof.

Referring to FIG. 5, a pattern 210 may include a first nanoparticle 310 and a second nanoparticle 320 that are different from each other. The first and second nanoparticles 310 and 320 may be substantially the same as the first and second nanoparticles 310 and 320 described with reference to FIG. 3.

A ligand 400 may be provided on a surface of each of the first and second nanoparticles 310 and 320. In some embodiments, the ligand 400 may be a conductive ligand. For example, the ligand 400 may include $SCN^-$, $I^-$, $Br^-$, $Cl^-$, or $OH^-$. In some embodiments, a plurality of ligands 400 may be provided on a surface of each of the first and second nanoparticles 310 and 320. The plurality of ligands 400 may enclose each of the first and second nanoparticles 310 and 320. In some embodiments, a length of the ligand 400 may be smaller than or equal to about 1 nm.

Directly adjacent ones of the first and second nanoparticles 310 and 320 may be spaced apart from each other. A distance between the first and second nanoparticles 310 and 320 may be adjusted by the plurality of ligands 400. For example, in some embodiments, the distance between the first and second nanoparticles 310 and 320 may be greater than a length of each of the ligands 400. For example, the distance between the directly adjacent ones of the first and second nanoparticles 310 and 320 may be greater than or equal to a length of each of the plurality of ligands 400 and may be less than or equal to about 1 nm.

The pattern 210 may include a plurality of first nanoparticles 310 and a plurality of second nanoparticles 320. Although, for concise description, two first nanoparticles 310 and two second nanoparticles 320 are only illustrated in FIG. 5, the numbers of the first nanoparticles 310 and the second nanoparticles 320 are not limited thereto. The directly adjacent ones of the first nanoparticles 310 may be spaced apart from each other. Distances between the directly adjacent ones of the first nanoparticles 310 may be adjusted by the plurality of ligands 400. In some embodiments, the distances between the directly adjacent ones of the first nanoparticles 310 may be greater than a length of each of the ligands 400. For example, the distance between the directly adjacent ones of the first nanoparticles 310 may be greater than or equal to a length of each of the plurality of ligands 400 and may be less than or equal to about 1 nm.

Directly adjacent ones of the second nanoparticles 320 may be spaced apart from each other. Distances between the directly adjacent ones of the second nanoparticles 320 may be adjusted by the plurality of ligands 400. In some embodiments, the distances between the directly adjacent ones of the second nanoparticles 320 may be greater than a length of each of the ligands 400. For example, the distances between the directly adjacent ones of the second nanoparticles 320 may be greater than or equal to the length of each of the ligands 400 and may be less than or equal to about 1 nm.

The first and second nanoparticles 310 and 320 may be provided adjacent to each other and may be electrically coupled to each other. In the case where the metamaterial structure includes the first and second nanoparticles 310 and 320 electrically coupled to each other, the metamaterial structure may have permittivity different from that of each of the first and second nanoparticles 310 and 320. According to some embodiments of the inventive concept, the permittivity and refractive index of the metamaterial structure may be controlled by changing the kind of each of the first and second nanoparticles 310 and 320.

Figure 6:
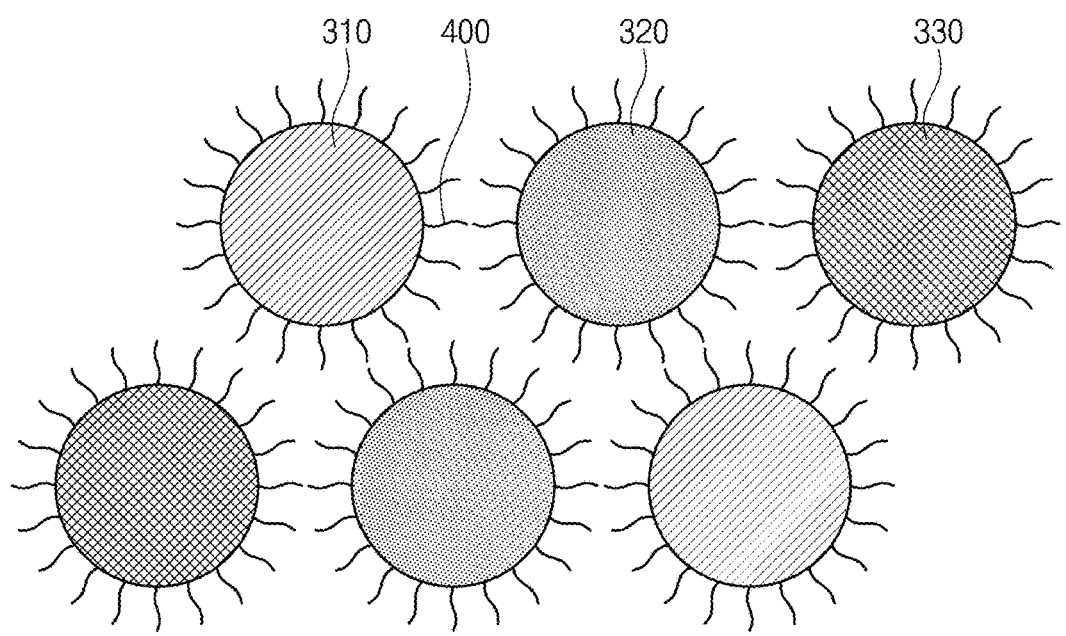
FIG. 6 is an enlarged view of a portion (e.g., corresponding to the portion 'A' of FIG. 2) of a metamaterial structure according to some embodiments of the inventive concept.

FIG. 6 is an enlarged view of a portion (e.g., corresponding to the portion 'A' of FIG. 2) of a metamaterial structure according to some embodiments of the inventive concept. For concise description, an element previously described with reference to FIGS. 1 to 5 may be identified by a similar or identical reference number without repeating an overlapping description thereof.

Referring to FIG. 6, a pattern 210 may include a first nanoparticle 310, a second nanoparticle 320, and a third nanoparticle 330 that are different from each other. The first to third nanoparticles 310, 320, and 330 may be substantially the same as the first to third nanoparticles 310, 320 and 330 described with reference to FIG. 4. A ligand 400 may be provided on a surface of each of the first to third nanoparticles 310, 320, and 330. The ligand 400 on the surface of each of the first and second nanoparticles 310 and 320 may be substantially the same as the ligand 400 described with reference to FIG. 5.

The ligand 400 may be coupled to a surface of the third nanoparticle 330. In some embodiments, the ligand 400 may be conductive. For example, the ligand 400 may include $SCN^-$, $I^-$, $Br^-$, $Cl^-$, or $OH^-$. In some embodiments, a plurality of ligands 400 may be provided on a surface of the third nanoparticle 330. The plurality of ligands 400 may enclose the third nanoparticle 330.

Directly adjacent ones of the first to third nanoparticles 310, 320, and 330 may be spaced apart from each other. Distances between the first to third nanoparticles 310, 320, and 330 may be adjusted by the plurality of ligands 400. In some embodiments, distances between the first to third nanoparticles 310, 320, and 330 may be greater than a length of each of the ligands 400. For example, the distances between the directly adjacent ones of the first to third nanoparticles 310, 320, and 330 may be greater than or equal to a length of each of the plurality of ligands 400 and may be less than or equal to about 1 nm.

The pattern 210 may include a plurality of first nanoparticles 310, a plurality of second nanoparticles 320, and a plurality of third nanoparticles 330. The first and second nanoparticles 310 and 320 may be substantially the same as the first and second nanoparticles 310 and 320 described with reference to FIG. 5. Although, for concise description, two third nanoparticles 330 are only illustrated in FIG. 6, the number of the third nanoparticles 330 is not limited thereto. Directly adjacent ones of the third nanoparticles 330 may be spaced apart from each other. Distances between the directly adjacent ones of the third nanoparticles 330 may be adjusted by the plurality of ligands 400. In some embodiments, the distances between the directly adjacent ones of the third nanoparticles 330 may be greater than a length of each of the ligands 400. For example, the distances between the directly adjacent ones of the third nanoparticles 330 may be greater than or equal to a length of each of the ligands 400 and may be less than or equal to about 1 nm.

The first to third nanoparticles 310, 320, and 330 may be provided to be adjacent to each other and to be in an electrically-coupled state. In the case where the metamaterial structure includes the first to third nanoparticles 310, 320, and 330 electrically coupled to each other, the metamaterial structure may have permittivity different from that of each of the first to third nanoparticles 310, 320, and 330. According to some embodiments of the inventive concept, the permittivity and refractive index of the metamaterial structure may be controlled by changing the kind of each of the first to third nanoparticles 310, 320, and 330.

Figure 7:
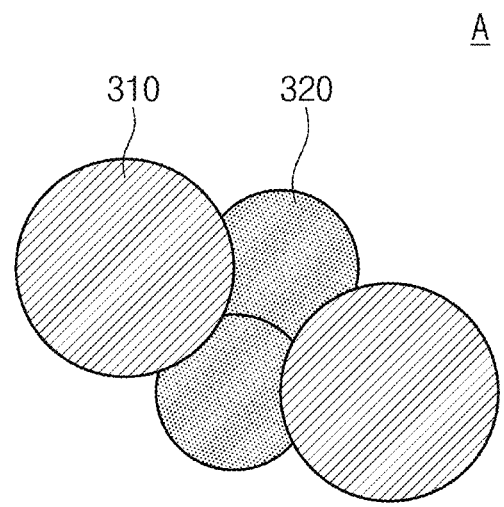
FIG. 7 is an enlarged view of a portion (e.g., corresponding to the portion 'A' of FIG. 2) of a metamaterial structure according to some embodiments of the inventive concept.

FIG. 7 is an enlarged view of a portion (e.g., corresponding to the portion 'A' of FIG. 2) of a metamaterial structure according to some embodiments of the inventive concept. For concise description, an element previously described with reference to FIGS. 1 to 3 may be identified by a similar or identical reference number without repeating an overlapping description thereof.

Referring to FIG. 7, a pattern 210 may include a first nanoparticle 310 and a second nanoparticle 320 that are different from each other. The first nanoparticle 310 may be substantially the same as the first nanoparticle 310 described with reference to FIG. 3. Except for difference in size, the second nanoparticle 320 may be substantially the same as the second nanoparticle 320 described with reference to FIG. 3. The size of the second nanoparticle 320 may be different from that of the first nanoparticle 310. For example, the second nanoparticle 320 may be smaller than the first nanoparticle 310.

Figure 8:
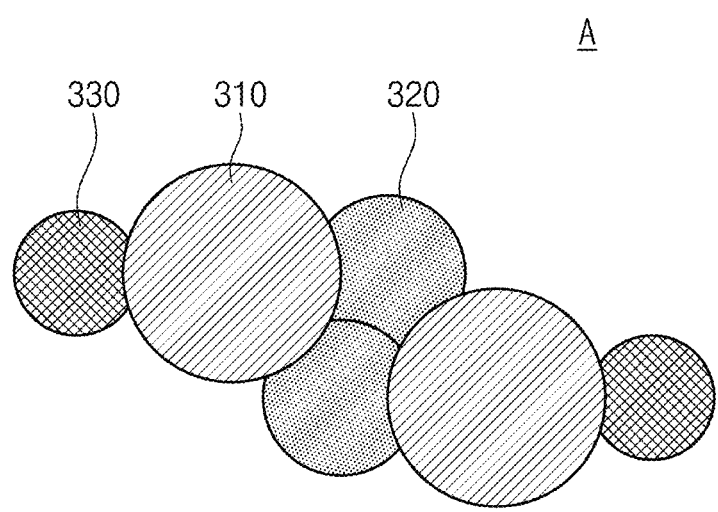
FIG. 8 is an enlarged view of a portion (e.g., corresponding to the portion 'A' of FIG. 2) of a metamaterial structure according to some embodiments of the inventive concept.

FIG. 8 is an enlarged view of a portion (e.g., corresponding to the portion 'A' of FIG. 2) of a metamaterial structure according to some embodiments of the inventive concept. For concise description, an element previously described with reference to FIGS. 1, 2, 4, and 7 may be identified by a similar or identical reference number without repeating an overlapping description thereof.

Referring to FIG. 8, a pattern 210 may include a first nanoparticle 310, a second nanoparticle 320, and a third nanoparticle 330 that are different from each other. The first and second nanoparticles 310 and 320 may be substantially the same as the first and second nanoparticles 310 and 320 described with reference to FIG. 7. Except for difference in size, the third nanoparticle 330 may be substantially the same as the third nanoparticle 330 described with reference to FIG. 4. The size of the third nanoparticle 330 may be different from that of each of the first and second nanoparticles 310 and 320. For example, the third nanoparticle 330 may be smaller than each of the first and second nanoparticles 310 and 320.

Figure 9:
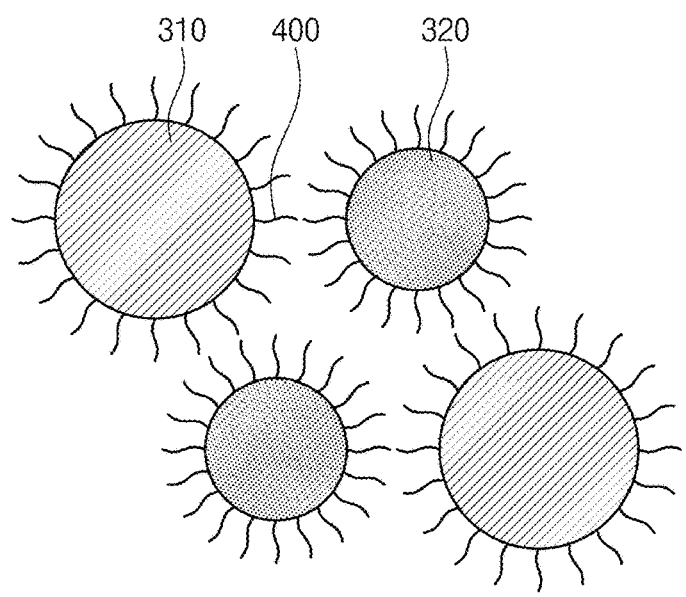
FIG. 9 is an enlarged view of a portion (e.g., corresponding to the portion 'A' of FIG. 2) of a metamaterial structure according to some embodiments of the inventive concept.

FIG. 9 is an enlarged view of a portion (e.g., corresponding to the portion 'A' of FIG. 2) of a metamaterial structure according to some embodiments of the inventive concept. For concise description, an element previously described with reference to FIGS. 1, 2, and 5 may be identified by a similar or identical reference number without repeating an overlapping description thereof.

Referring to FIG. 9, a pattern 210 may include a first nanoparticle 310 and a second nanoparticle 320 that are different from each other. Each of the first and second nanoparticles 310 and 320 may include a ligand 400 on a surface thereof. The first nanoparticle 310 and the ligands 400 may be substantially the same as the first nanoparticle 310 and the ligands 400 described with reference to FIG. 5. Except for difference in size, the second nanoparticle 320 may be substantially the same as the second nanoparticle 320 described with reference to FIG. 5. The size of the second nanoparticle 320 may be different from that of the first nanoparticle 310. For example, the second nanoparticle 320 may be smaller than the first nanoparticle 310.

Figure 10:
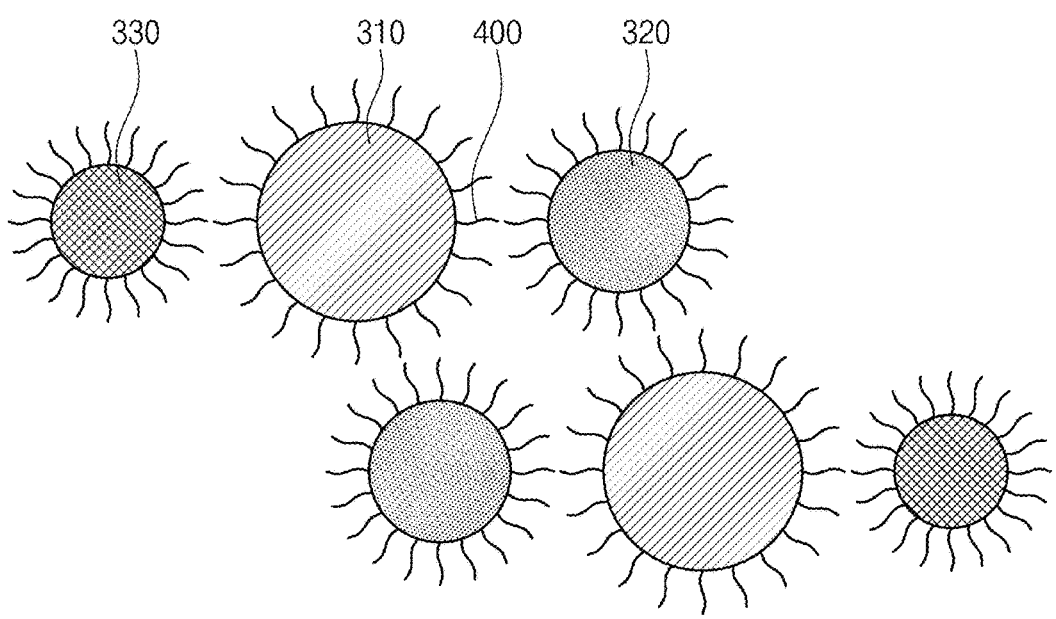
FIG. 10 is an enlarged view of a portion (e.g., corresponding to the portion 'A' of FIG. 2) of a metamaterial structure according to some embodiments of the inventive concept.

FIG. 10 is an enlarged view of a portion (e.g., corresponding to the portion 'A' of FIG. 2) of a metamaterial structure according to some embodiments of the inventive concept. For concise description, an element previously described with reference to FIGS. 1, 2, 6, and 9 may be identified by a similar or identical reference number without repeating an overlapping description thereof.

Referring to FIG. 10, a pattern 210 may include a first nanoparticle 310, a second nanoparticle 320, and a third nanoparticle 330 that are different from each other. Each of the first to third nanoparticles 310, 320, and 330 may include a ligand 400 on a surface thereof. The first and second nanoparticles 310 and 320 and the ligands 400 may be substantially the same as the first and second nanoparticles 310 and 320 and the ligands 400 described with reference to FIG. 9. Except for difference in size, the third nanoparticle 330 may be substantially the same as the third nanoparticle 330 described with reference to FIG. 6. The size of the third nanoparticle 330 may be different from that of each of the first and second nanoparticles 310 and 320. For example, the third nanoparticle 330 may be smaller than each of the first and second nanoparticles 310 and 320.

Figure 11:
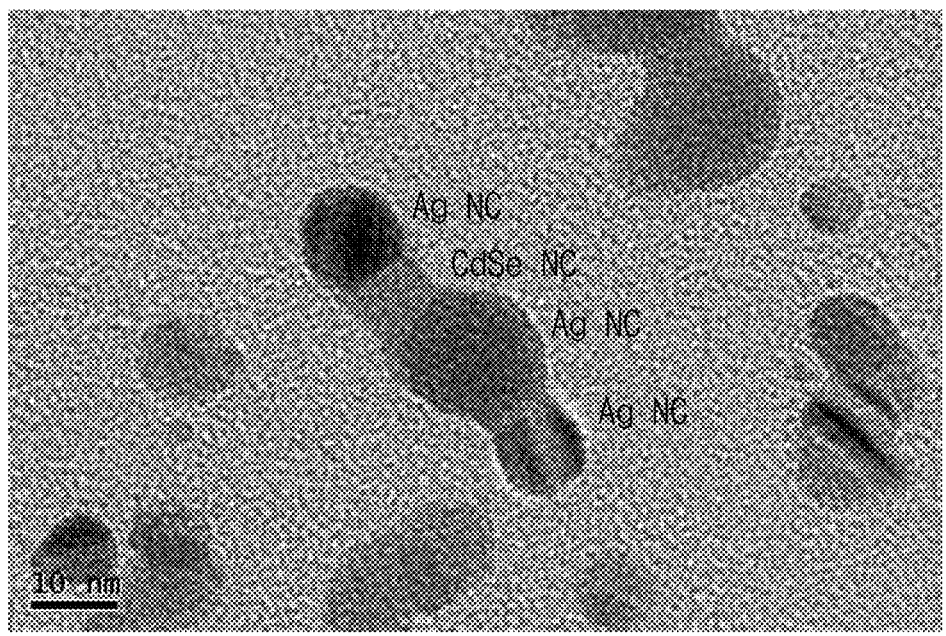
FIG. 11 is an image showing a structure including electrically-coupled Ag and CdSe nanoparticles.
Figure 12:
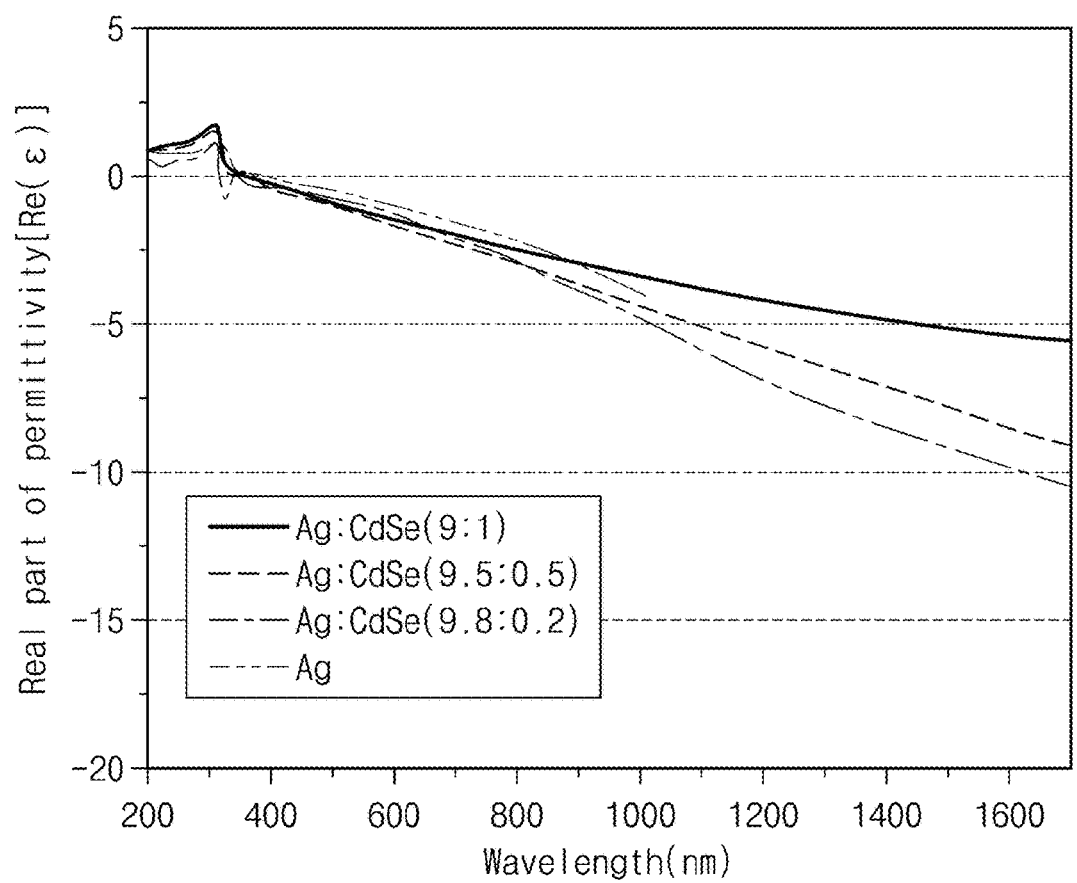
FIG. 12 is a graph showing a real part of permittivity of a structure including electrically-coupled Ag and CdSe nanoparticles.
Figure 13:
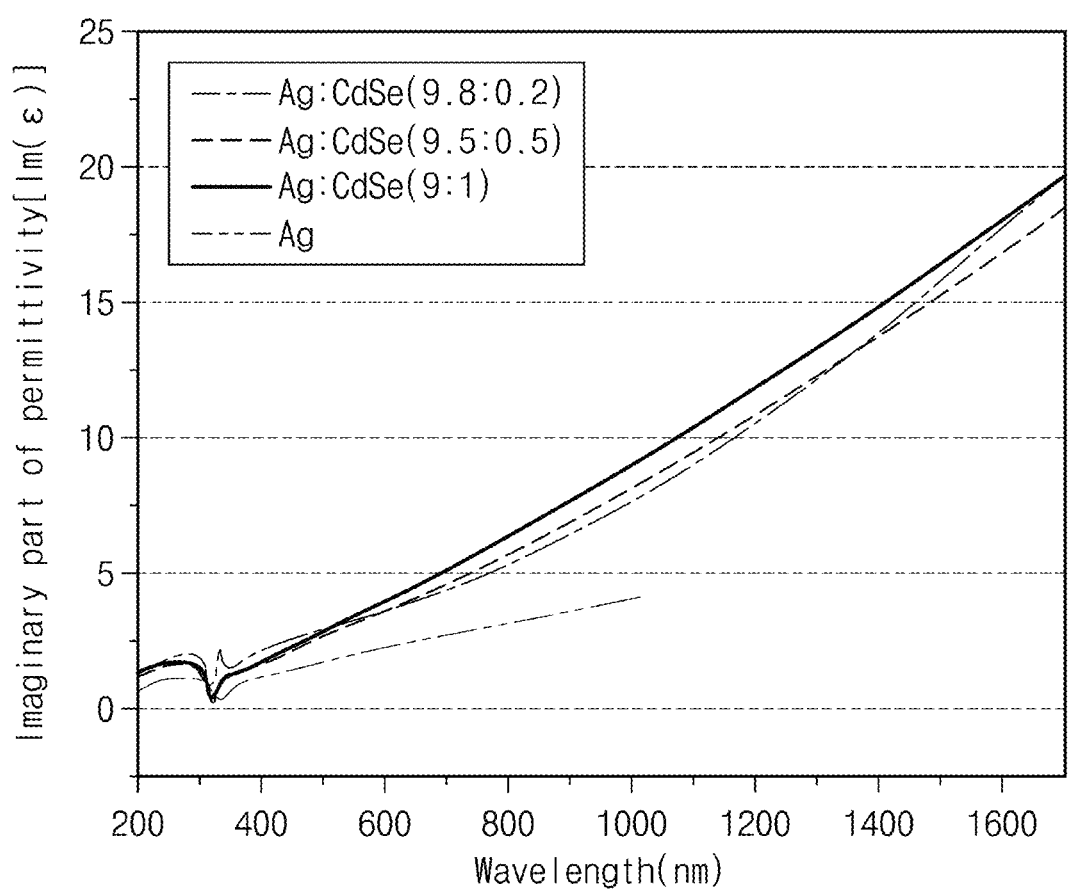
FIG. 13 is a graph showing an imaginary part of permittivity of a structure including electrically-coupled Ag and CdSe nanoparticles.
Figure 14:
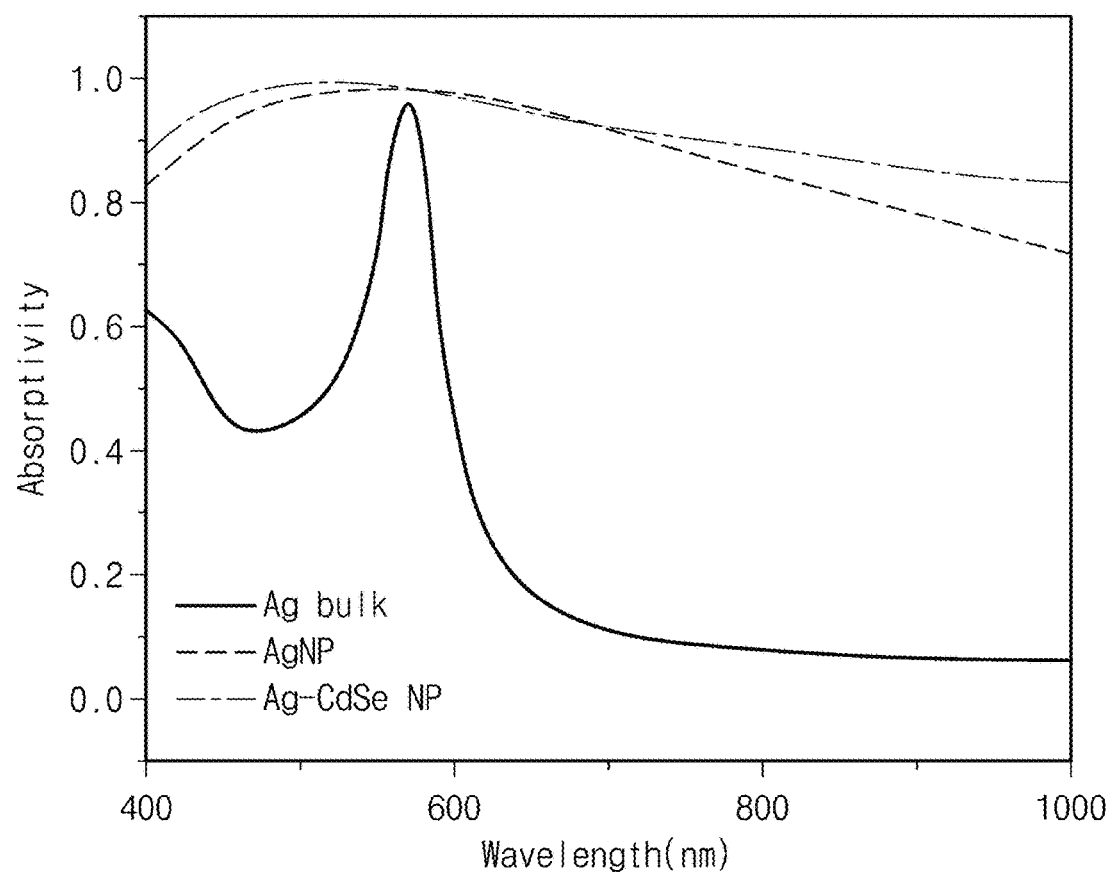
FIG. 14 is a graph showing absorptivity characteristics of a metamaterial structure including electrically-coupled Ag and CdSe nanoparticles.

FIG. 11 is an image showing a structure including electrically-coupled Ag and CdSe nanoparticles. FIG. 12 is a graph showing a real part of permittivity of a structure including electrically-coupled Ag and CdSe nanoparticles. FIG. 13 is a graph showing an imaginary part of permittivity of a structure including electrically-coupled Ag and CdSe nanoparticles. FIG. 14 is a graph showing absorptivity characteristics of a metamaterial structure including electrically-coupled Ag and CdSe nanoparticles.

Referring to FIG. 11, a silver nanoparticle (Ag NC) and a CdSe nanoparticle (CdSe NC) were electrically coupled to each other. Each of the silver nanoparticle (Ag NC) and the CdSe nanoparticle (CdSe NC) includes a ligand (not shown) on a surface thereof.

The graph of FIG. 12 shows a change in real part of permittivity to be caused by a change in wavelength, and composition ratios of Ag to CdSe were 9:1, 9.5:0.5, 9.8:0.2, and 1:0. FIG. 12 shows that the real part of permittivity can be controlled by changing a composition ratio of Ag to CdSe.

The graph of FIG. 13 shows a change in imaginary part of permittivity to be caused by a change in wavelength, and composition ratios of Ag to CdSe were 9:1, 9.5:0.5, 9.8:0.2, and 1:0. FIG. 13 shows that the imaginary part of permittivity can be controlled by changing a composition ratio of Ag to CdSe.

Referring to FIG. 14, a change in absorptivity to be caused by a change in wavelength was measured from metamaterial structures including a silver layer (Ag bulk), a silver nanoparticle (Ag NP), and electrically-coupled Ag and CdSe nanoparticles (Ag—CdSe NP). Unlike the metamaterial structures including the silver layer (Ag bulk) and the silver nanoparticle (Ag NP), the absorptivity of the metamaterial structure including electrically-coupled Ag and CdSe nanoparticles (Ag—CdSe NP) was 80% or higher for an electromagnetic wave whose wavelength ranges from 400 nm to 1000 nm. In particular, the absorptivity of the metamaterial structure including electrically-coupled Ag and CdSe nanoparticles (Ag—CdSe NP) was 98% or higher for an electromagnetic wave whose wavelength ranges from about 450 nm to about 600 nm.

FIGS. 15 and 17 to 19 are sectional views, which are taken along line I-I' of FIG. 1 to illustrate a method of fabricating a metamaterial structure, according to some embodiments of the inventive concept. FIG. 16 is an enlarged view of a portion 'B' of FIG. 15. For concise description, an element previously described with reference to FIGS. 1 to 10 may be identified by a similar or identical reference number without repeating an overlapping description thereof.

Figure 15:
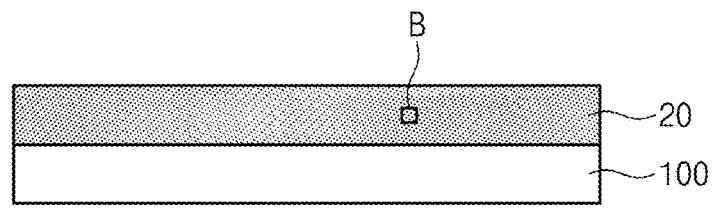
FIGS. 15 and 17 to 19 are sectional views, which are taken along line I-I' of FIG. 1 to illustrate a method of fabricating a metamaterial structure, according to some embodiments of the inventive concept.
Figure 16:
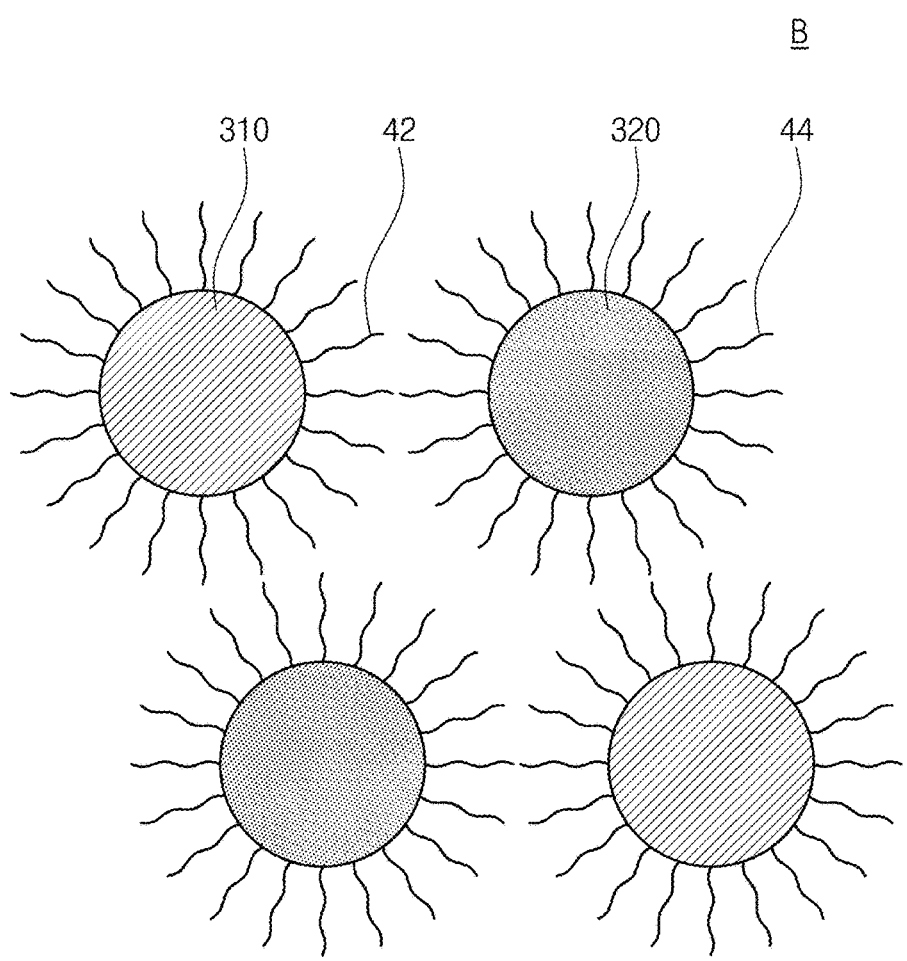
FIG. 16 is an enlarged view of a portion 'B' of FIG. 15.

Referring to FIGS. 15 and 16, a substrate 100 may be provided. The substrate 100 may be formed of or include a transparent material. The substrate 100 may be formed of or include, for example, silicon, glass, or transparent polymer material. Nanoparticle solution 20 may be provided on the substrate 100. For example, the nanoparticle solution 20 may be formed to coat a top surface of the substrate 100. The nanoparticle solution 20 may include a first nanoparticle 310 and a second nanoparticle 320, as shown in FIG. 16. For example, the first and second nanoparticles 310 and 320 may be substantially the same as the first and second nanoparticles 310 and 320 described with reference to FIG. 5.

In some embodiments, although not shown, the first and second nanoparticles 310 and 320 may be substantially the same as the first and second nanoparticles 310 and 320 described with reference to FIG. 9. In some embodiments, although not shown, the nanoparticle solution 20 may further include a third nanoparticle. Here, the third nanoparticle may be substantially the same as the third nanoparticle 330 described with reference to FIG. 6 or 10.

A first preliminary ligand 42 may be provided on a surface of the first nanoparticle 310. A second preliminary ligand 44 may be provided on a surface of the second nanoparticle 320. The first and second preliminary ligands 42 and 44 may be coupled to respective surfaces of the first and second nanoparticles 310 and 320 and may allow the first and second nanoparticles 310 and 320 to be spaced apart from each other. For example, if the first and second preliminary ligands 42 and 44 are not provided on respective surfaces of the first and second nanoparticles 310 and 320, the first and second nanoparticles 310 and 320 may agglomerate each other and may not be dispersed. By contrast, if the first and second preliminary ligands 42 and 44 are provided on respective surfaces of the first and second nanoparticles 310 and 320, the first and second nanoparticles 310 and 320 may be dispersed in the nanoparticle solution 20. In some embodiments, the first and second preliminary ligands 42 and 44 may be of the same kind. For example, each of the first and second preliminary ligands 42 and 44 may be a chlorophyll A (CLA) ligand. However, the first and second preliminary ligands 42 and 44 may not be limited thereto. In certain embodiments, the first and second preliminary ligands 42 and 44 may differ from each other. A length of each of the first and second preliminary ligands 42 and 44 may be longer than that of the ligand 400 described with reference to FIG. 5.

Figure 17:
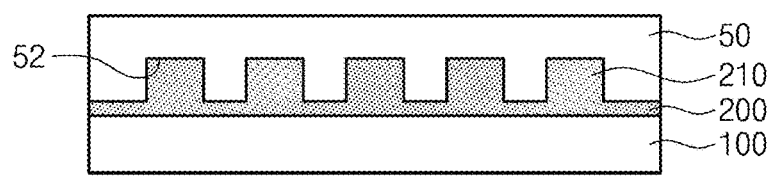
Figure 18:
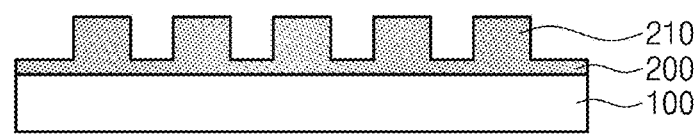

Referring to FIGS. 17 and 18, a stamp 50 may be used to exert pressure on the nanoparticle solution 20. In some embodiments, the stamp 50 may be formed of or include a polymer material (e.g., polydimethylsiloxane (PDMS) or polyvinyl chloride (PVC)). The stamp 50 may have an uneven or concavo-convex bottom surface 52. The nanoparticle solution 20 may be provided between the bottom surface 52 of the stamp 50 and the top surface of the substrate 100, and thus, the pressure may be exerted thereon. A patterning layer 200 may be formed by curing the nanoparticle solution 20. For example, the nanoparticle solution 20 may be cured by a thermal treatment process, and as a result, the patterning layer 200 may be formed. A top surface of the patterning layer 200 may have an uneven or concavo-convex shape defined by the bottom surface 52 of the stamp 50. The patterning layer 200 may include patterns 210 formed at an upper portion thereof. After the curing of the patterning layer 200, the stamp 50 may be removed, as shown in FIG. 18. The patterns 210 may be substantially the same as the patterns 210 described with reference to FIGS. 1 and 2. In certain embodiments, the patterning layer 200 may be provided to have only the patterns 210, as shown in FIG. 2.

Figure 19:
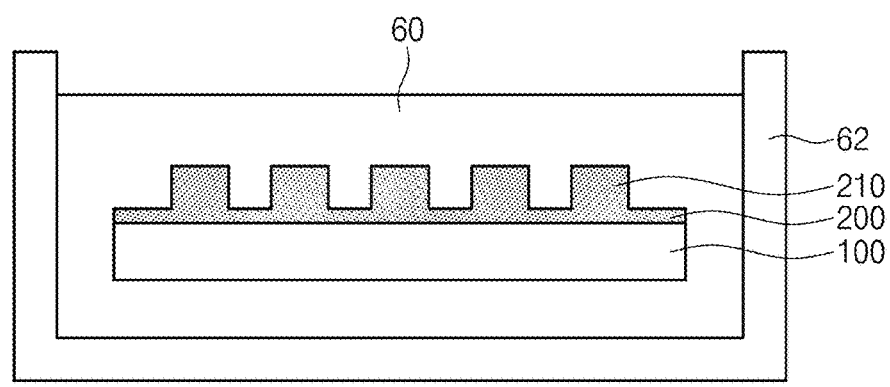

Referring to FIG. 19, a ligand exchange process on the patterning layer 200 may be performed to convert the first and second preliminary ligands 42 and 44 to the ligands 400 shown in FIG. 5. The ligand exchange process may include dipping the patterning layer 200 into a substitutional solution 60 for a given time period. In some embodiments, the ligand exchange process may be performed at an ordinary temperature. The substitutional solution 60 may be provided in a vessel 62. The substitutional solution 60 may include ligands 400. As a result of the ligand exchange process on the patterning layer 200, the first and second preliminary ligands 42 and 44 may be removed from the first and second nanoparticles 310 and 320, respectively. As a result of the ligand exchange process on the patterning layer 200, the ligands 400 in the substitutional solution 60 may be coupled to respective surfaces of the first and second nanoparticles 310 and 320. The ligands 400 may be substantially the same as the ligands 400 described with reference to FIG. 5. A length of each of the ligands 400 may be shorter than that of each of the first and second preliminary ligands 42 and 44. The ligands 400 may include, for example, $SCN^-$, $I^-$, $Br^-$, $Cl^-$, or $OH^-$. A distance between the first and second nanoparticles 310 and 320 may be shorter after the ligand exchange process than before the ligand exchange process. After the ligand exchange process, the vessel 62 and the substitutional solution 60 may be removed. The substrate 100 and the patterning layer 200 may constitute a metamaterial structure.

The first and second nanoparticles 310 and 320 may be provided to be adjacent to each other and may be in an electrically-coupled state. In the case where the metamaterial structure includes the first and second nanoparticles 310 and 320 that are electrically coupled to each other, the metamaterial structure may have permittivity different from that of each of the first and second nanoparticles 310 and 320. According to some embodiments of the inventive concept, the permittivity and refractive index of the metamaterial structure may be controlled by changing the kind of each of the first and second nanoparticles 310 and 320.

Figure 20:
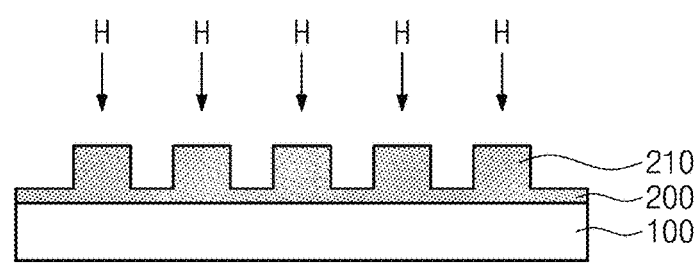
FIG. 20 is a sectional view, which is taken along line I-I' of FIG. 1 to illustrate a method of fabricating a metamaterial structure, according to some embodiments of the inventive concept.

FIG. 20 is a sectional view, which is taken along line I-I' of FIG. 1 to illustrate a method of fabricating a metamaterial structure, according to some embodiments of the inventive concept. For concise description, an element previously described with reference to FIGS. 15 to 18 may be identified by a similar or identical reference number without repeating an overlapping description thereof.

Referring back to FIGS. 15, 17, and 18, a patterning layer 200 may be formed on a substrate 100. The nanoparticle solution 20 and the patterning layer 200 may include the first and second nanoparticles 310 and 320. Unlike that shown in FIG. 16, the first and second nanoparticles 310 and 320 may be substantially the same as the first and second nanoparticles 310 and 320 described with reference to FIGS. 3 and 7. In other words, each of the first and second nanoparticles 310 and 320 may not include ligand 400 on a surface thereof.

Referring to FIG. 20, a thermal treatment process H may be performed on the patterning layer 200. For example, the thermal treatment process H on the patterning layer 200 may be performed at a temperature of about 250° C. As a result of the thermal treatment process H on the patterning layer 200, the first and second nanoparticles 310 and 320 may be sintered. The first and second nanoparticles 310 and 320, which are sintered by the thermal treatment process H, may be in direct contact with each other, as shown in FIGS. 3 and 7. The first and second nanoparticles 310 and 320 may be provided adjacent to each other and may be electrically coupled to each other. In the case where the metamaterial structure includes the first and second nanoparticles 310 and 320 electrically coupled to each other, the metamaterial structure may have permittivity different from that of each of the first and second nanoparticles 310 and 320. According to some embodiments of the inventive concept, the permittivity and refractive index of the metamaterial structure may be controlled by changing the kind of each of the first and second nanoparticles 310 and 320.

In certain embodiments, the patterning layer 200 may further include a third nanoparticle 330. The first to third nanoparticles 310, 320, and 330, which are sintered by the thermal treatment process H, may be substantially the same as the first to third nanoparticles 310, 320, and 330 described with reference to FIGS. 4 and 8.

According to some embodiments of the inventive concept, provided is a metamaterial structure including different nanoparticles, which are electrically coupled to each other. Permittivity of the metamaterial structure may be changed by adjusting shapes and kinds of the nanoparticles and a distance between the nanoparticles. Since a refractive index of the metamaterial structure is dependent on the permittivity of the metamaterial structure, it is possible to control the refractive index of the metamaterial structure.

While example embodiments of the inventive concepts have been particularly shown and described, it will be understood by one of ordinary skill in the art that variations in form and detail may be made therein without departing from the spirit and scope of the attached claims.

What is claimed is:

1. A metamaterial structure, comprising:
    a substrate; and
    patterns provided on the substrate,
    wherein the patterns are arranged in a direction parallel to a top surface of the substrate,
    each of the patterns comprises a first nanoparticle and a second nanoparticle containing a different material from the first nanoparticle, and
    the first and second nanoparticles are provided to be adjacent to each other and to be in an electrically-coupled state.

2. The metamaterial structure of claim 1, further comprising a conductive ligand coupled to a surface of each of the first and second nanoparticles.

3. The metamaterial structure of claim 1, wherein a space between the first and second nanoparticles is less than 10 nm.

4. The metamaterial structure of claim 1, wherein the first and second nanoparticles comprise metal particles that are respectively different from each other.

5. The metamaterial structure of claim 4, wherein each of the first and second nanoparticles comprises silver (Ag), gold (Au), copper (Cu), aluminum (Al), nickel (Ni), chromium (Cr), or lead (Pb).

6. The metamaterial structure of claim 1, wherein the first nanoparticle comprises a metal particle, and
    the second nanoparticle comprises a semiconductor particle.

7. The metamaterial structure of claim 6, wherein the second nanoparticle comprises an elementary semiconductor particle or a compound semiconductor particle.

8. The metamaterial structure of claim 7, wherein the second nanoparticle comprises CdSe, PbSe, PbS, or PbTe.

9. The metamaterial structure of claim 1, wherein the first and second nanoparticles are in contact with each other.

10. The metamaterial structure of claim 1, further comprising a third nanoparticle containing a material different from the first and second nanoparticles,
    wherein the first to third nanoparticles are provided to be adjacent to each other and to be in an electrically-coupled state.

11. The metamaterial structure of claim 10, wherein the third nanoparticle comprises a metal particle or a semiconductor particle.

12. The metamaterial structure of claim 1, wherein the metamaterial structure has a negative refractive index.

13. The metamaterial structure of claim 1, wherein each of the patterns has a circular pillar shape.

14. The metamaterial structure of claim 13, wherein a height and a diameter of each of the patterns range from several nanometers to several hundred micrometers, and
    a distance between directly adjacent ones of the patterns ranges from several nanometers to several hundred micrometers.

15. A method of fabricating a metamaterial structure, comprising:
    providing a substrate;
    providing a nanoparticle solution on the substrate, the nanoparticle solution containing a first nanoparticle and a second nanoparticle containing a different material from the first nanoparticle;
    exerting pressure on the nanoparticle solution using a stamp; and
    curing the nanoparticle solution to form patterns including the first and second nanoparticles,
    wherein the first and second nanoparticles are provided to be adjacent to each other and to be in an electrically-coupled state,
    the stamp has an uneven surface, and
    shapes of the patterns are defined by the uneven surface of the stamp.

16. The method of claim 15, further comprising sintering the patterns to bring the first and second nanoparticles in contact with each other.

17. The method of claim 15, wherein each of the first and second nanoparticles comprises a first ligand coupled to a surface thereof,
    the method further comprises performing a ligand exchange process on the patterns,
    the ligand exchange process is performed to convert the first ligand, which is coupled to each of the first and second nanoparticles, into a second ligand,
    a length of the second ligand is shorter than that of the first ligand.

18. The method of claim 17, wherein the ligand exchange process comprises:
    preparing a substitutional solution, in which the second ligand is contained; and
    dipping the patterns into the substitutional solution.

19. The method of claim 17, wherein the second ligand comprises $SCN^-$, $I^-$, $Br^-$, $Cl^-$, or $OH^-$.

* * * * *